United States Patent
Rinke et al.

(10) Patent No.: US 10,169,407 B2
(45) Date of Patent: Jan. 1, 2019

(54) METHOD FOR THE EFFICIENT ANALYSIS OF PROCESS DATA

(71) Applicant: Celonis SE, Munich (DE)

(72) Inventors: Alexander Rinke, Munich (DE); Martin Klenk, Munich (DE); Bastian Nominacher, Munich (DE)

(73) Assignee: CELONIS SE, München (DE)

(*) Notice: Subject to any disclaimer, the term of this patent is extended or adjusted under 35 U.S.C. 154(b) by 498 days.

(21) Appl. No.: 14/846,440

(22) Filed: Sep. 4, 2015

(65) Prior Publication Data

US 2017/0068702 A1    Mar. 9, 2017

(51) Int. Cl.
*G06F 17/30* (2006.01)
*G06F 9/50* (2006.01)
*G06Q 10/06* (2012.01)

(52) U.S. Cl.
CPC .......... *G06F 17/30424* (2013.01); *G06F 9/50* (2013.01); *G06F 17/30312* (2013.01); *G06F 17/30584* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 5,596,736 A | * | 1/1997 | Kerns | G06F 3/0601 711/100 |
| 7,698,495 B2 | * | 4/2010 | Dodge | G06F 12/0866 710/22 |
| 9,104,728 B2 | | 8/2015 | Ngai et al. | |
| 2003/0028509 A1 | * | 2/2003 | Sah | G06F 17/30595 |
| 2005/0240604 A1 | * | 10/2005 | Corl, Jr. | H03M 7/30 |
| 2008/0005093 A1 | | 1/2008 | Liu et al. | |
| 2011/0051744 A1 | * | 3/2011 | Agarwal | G06F 12/0875 370/469 |
| 2011/0184969 A1 | | 7/2011 | Idicula et al. | |

(Continued)

OTHER PUBLICATIONS

Third Party Observation for corresponding European Patent Application No. EP20160186720, which took place on Mar. 13, 2018, and received by an individual under 37 CFR 1.56(c)(3) on Apr. 9, 2018, with machine translation.

(Continued)

*Primary Examiner* — Christopher J Raab
(74) *Attorney, Agent, or Firm* — Myers Wolin, LLC

(57) ABSTRACT

A computer-implemented method is provided for storing process data. The method comprises allocating a storage area for the process data in the storage means, loading the process data, from the at least one source system, and storing the process steps according to a predetermined data structure in the allocated storage area of the storage means. The predetermined data structure comprises a first attribute, in which a unique identification of the process instance of the respective process step is stored, a second attribute, in which an identification of the respective process step is stored, and a third attribute, in which the sequence of the process steps within a process instance is stored. The method then sorts the process steps in the allocated storage area, wherein the process steps are first sorted according to the first attribute, and subsequently, according to the third attribute.

17 Claims, 5 Drawing Sheets

(56) References Cited

U.S. PATENT DOCUMENTS

| | | | | |
|---|---|---|---|---|
| 2012/0117064 | A1* | 5/2012 | Draese | G06F 17/30592 |
| | | | | 707/737 |
| 2012/0166234 | A1* | 6/2012 | Drittler | G06Q 10/063 |
| | | | | 705/7.11 |
| 2014/0214897 | A1 | 7/2014 | Zhu et al. | |
| 2014/0281748 | A1 | 9/2014 | Ercegovac et al. | |
| 2015/0363113 | A1 | 12/2015 | Rahman et al. | |
| 2016/0110426 | A1 | 4/2016 | Gaza et al. | |
| 2016/0147814 | A1* | 5/2016 | Goel | G06F 17/30368 |
| | | | | 707/600 |
| 2016/0342523 | A1* | 11/2016 | Rozario | G06F 12/0844 |

OTHER PUBLICATIONS

Third Party Observation for corresponding European Patent Application No. EP20160186721, which took place on Mar. 13, 2018, and received by an individual under 37 CFR 1.56(c)(3) on Apr. 10, 2018, with machine translation.

Third Party Observation for corresponding European Application No. EP20160186722, which took place on Feb. 22, 2018, and received by an individual under 37 CFR 1.56(c)(3) on Mar. 15, 2018, with machine translation.

Wil M.P. Van Der Aalst, "Process Mining: Discovering and Improving Spaghetti and Lasagna Processes", IEEE Symposium on Computational Intelligence and Data Mining (CIDM 2011), pp. 13-20, Paris, France, Apr. 2011.

Information Systems, Data: Creation, Management and Utilization, Editor: Felix Nauman—The Process Mining Manifesto—An interview with W. v. der Aalst, May 2012, pp. 288-290.

Science direct, Computers in Industry Process, W.M.P.van der Aalst & A.J.M.M.Weijters process mining: a research agenda Apr. 2004, pp. 231-244.

Science direct, Information Systems, Aalst, Business process mining: An industrial application pp. 713-732, Elsevier B.V.

Workflow Management—Models, Methods and Systems: Wil van der Aalst, Kees van Hee, MIT Press, Cambridge, MA/London, England, 2002, 368 pp., 188 figs.

Marlon Dumas, Wil M. van der Aalst Arthur H. ter Hofstede Process-Aware Information Systems: Bridging People and Software Through Process Technology, Sep. 2005.

European Research Center for Information Systems, University of Muenster, 48149 Muenster, Germany, Available online Nov. 4, 2011.

van der Aalst, "The Process Mining: Discovery, Conformance and Enhancements of Business Processes", Springer, published Mar. 2011, pp. 1-352, The Netherlands.

Third party observation filed for EP Application EP20160186719 dated Dec. 9, 2017.

Office Action issued by the European Patent Office for related European Patent Application 16 186 720.5, dated Jun. 15, 2018, with an English translation.

Office Action issued by the European Patent Office for related European Patent Application 16 186 721.3, dated Jun. 15, 2018, with an English translation.

Office Action issued by the European Patent Office for related European Patent Application 16 186 722.1, dated Jun. 15, 2018, with an English translation.

Elmasri et al, Fundamentals of Database Systems (Sixth Edition), Chapter 2: "Database System Concepts and Architecture," pp. 29-55, Jan. 2011.

Elmasri et al, Fundamentals of Database Systems (Sixth Edition), Chapter 19: "Algorithms for Query Processing and Optimization," pp. 679-725, Jan. 2011.

Elmasri et al, Fundamentals of Database Systems (Sixth Edition), Chapter 18: "Indexing Structures for Files," pp. 631-675, Jan. 2011.

Elmasri et al, Fundamentals of Database Systems (Sixth Edition), Chapter 4: "Basic SQL," pp. 87-114, Jan. 2011.

Elmasri et al, Fundamentals of Database Systems (Sixth Edition), Chapter 26: "Enhanced Data Models for Advanced Applications," pp. 931-991, Jan. 2011.

* cited by examiner

| CaseID | Activity | Order | ParentID | SubProcID |
|---|---|---|---|---|
| 1 | A | 1 |  | Main |
| 1 | B | 2 |  | Main |
| 1 | C | 3 | Main | SP1 |
| 1 | D | 4 | Main | SP2 |
| 1 | E | 5 | Main | SP1 |
| 1 | F | 6 |  | Main |
Fig. 3A
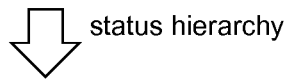
status hierarchy
|  | Step 1 | Step 2 | Step 3 | Step 4 | Step 5 | Step 6 |
|---|---|---|---|---|---|---|
| Main | 1 | 2 | 2 | 2 | 2 | 6 |
| SP1 | *1* | *2* | 3 | 3 | 5 | 6 |
| SP2 | *1* | *2* | *2* | 4 | 4 | 6 |
| edges |  | 1→2 | 2→3 | 2→4 | 3→5 | 2→6<br>5→6<br>4→6 |
Fig. 3B
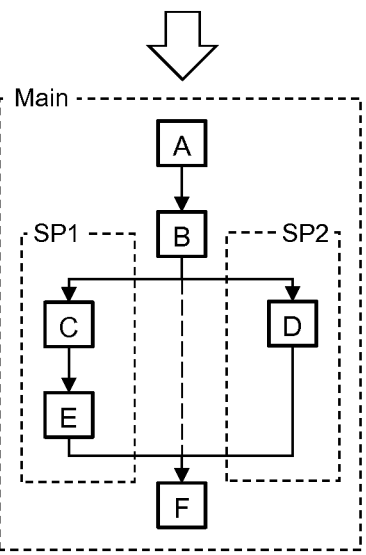
Fig. 3C

METHOD FOR THE EFFICIENT ANALYSIS OF PROCESS DATA

FIELD OF THE INVENTION

The invention relates to a flexible method for processing, reconstruction, and analysis of real business processes on the basis of event data generated by process instances. It is an object, to be able to monitor, analyze, and visualize a current state of individual or multiple processes.

PRIOR ART AND BACKGROUND OF THE INVENTION

It is known to analyze business processes on the basis of digital trails (process protocols) in IT systems. The entirety of process steps stored in an IT system results in a process which can automatically be reconstructed and analyzed.

The analysis usually is not performed in the source systems (e.g., the ERP system), but rather in a data base separate from the source systems. The data is extracted from the source systems, the extracted data is transformed, and the transformed data is stored in a data base. The analysis of the processes is then carried out on the data stored in this data base.

With respect to the methods known from prior art, it is disadvantageous, for example, that the analysis possibilities on the basis of the data generated by the instances of the real process (process instance protocols) are restricted with respect to flexibility, the performance, as well as the possibility of analyzing arbitrarily complex, potentially parallel processes. Only predefined analyses can be carried out. The analysis of very complex parallel processes is imprecise, and the performance of the algorithms is not sufficient for processing very large data sets having several hundred millions of process instances.

OBJECT OF THE INVENTION

It is an object of the invention to provide solutions, which enable a simpler, improved, more flexible, and efficient analysis of potentially parallel running processes of arbitrary complexity.

Solution According to the Invention

This object is solved according to the invention by a method as well as a system according to the independent claims. Preferred embodiments and further developments of the invention are specified in the respective dependent claims.

BRIEF DESCRIPTION OF THE FIGURES

Details and features of the invention as well as concrete embodiments of the invention can be derived from the subsequent description in connection with the drawing, in which:

FIGS. 3A-C show data, by means of which the determination of parallel sub processes based on the process protocol is explained;

DETAILED DESCRIPTION OF THE INVENTION

Figure 1:
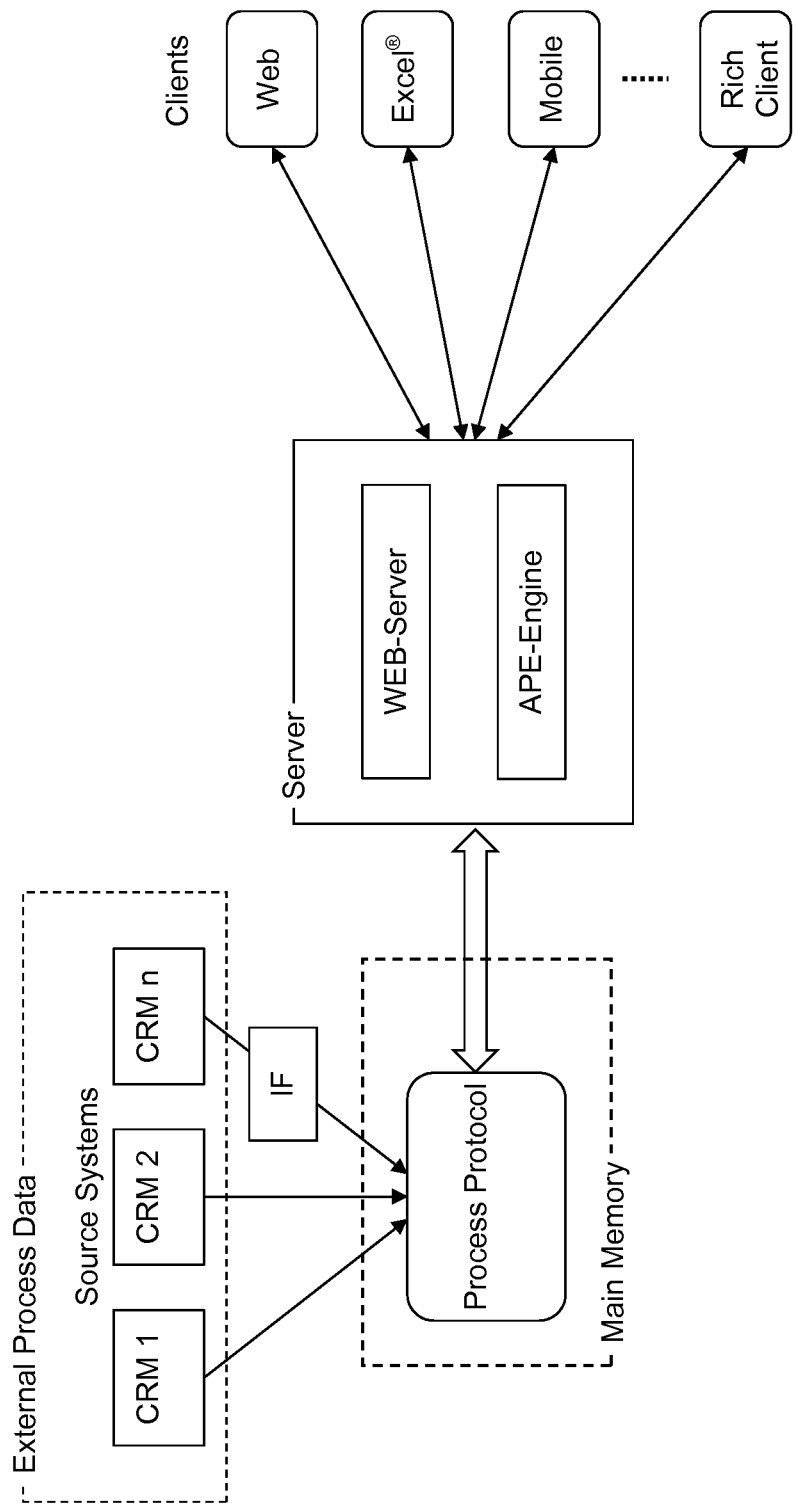
FIG. 1 shows a block diagram of the system according to the invention.

FIG. 1 shows a block diagram of a system according to the invention, by means of which the real processes (e.g., business processes) can be monitored ad hoc and, if needed, visualized. Modifications to the processes can also be acquired ad hoc.

In the following, the analysis of process protocols is explained in further detail.

If real processes such as business processes are carried out with the help of one or multiple IT systems, the process instances leave data trails in the participating IT systems. A production process for example can generate various data trails in different IT systems (each product produced, i.e., each process instance leaves trails at different machines, in the inventory system, etc.). Looking at the trails left by one complete run of the production process (e.g. one finished product) shows that—in this example—the trails contain much information about how the business process was actually executed. In every production step, timestamps are generated. Thereby, for example, a reproduction as to at which point in time the process step has been carried out is enabled. From this, a deduction, amongst others, as to which process steps are performed frequently and in which sequence, and how much time has elapsed between the production steps is enabled.

Looking at a plurality of runs of the production process and the entirety of data being left by these runs (in every step of the process), the process protocol is obtained. E.g. for processes with many process steps being carried out in different IT systems, this process protocol may become very comprehensive, and may comprise a plurality of data sets per process instance (i.e., for each run of the process). On the basis of the process protocol, various interrogations with respect to the execution of the real business process are now possible. For example, the question may be posed as to how homogeneous the production process is (i.e., how strong the individual runs of the production process differ from each other), how the core process looks like, and which patterns frequently lead to deviations from the core process.

The process protocol, thus, consists of data generated by the instances of a real process, and is present in a distributed manner in one or more IT systems.

The process protocol can be merged and stored in storage means of the server. Alternatively, the process protocol can also be stored in a storage means being physically separated from the server. According to the invention it is advantageous in both cases, if the process protocol is stored In-Memory (in the internal or main memory). Further, it is advantageous, if the process protocol is stored in a column orientated manner in the main memory.

It is an object of the invention, to enable a response to arbitrary interrogations with respect to the process protocol, in order to provide very flexible analyses for the real business processes.

The system according to the invention comprises a server means (server), which can be coupled to a number of clients. The server means further is adapted to access a process protocol.

The clients are adapted to submit requests or queries to the server and to receive answers from the server. The data received by the client may be processed, and may be displayed at a display means.

According to a preferred embodiment of the invention, the clients are adapted to submit queries to the server in an APE notation (APE queries) (APE=Advanced Process Algebra Execution). The Advanced Process Algebra Execution APE is a query language provided by the invention.

In the following, the APE is explained in further detail.

The process protocol has the property that for each process instance, an indefinite amount of (potentially differently structured) data sets is present from the individual process steps. Thus, for each instance, a different number of data sets may be present (depending on how many process steps the instance has run through for how many times).

The APE is adapted to query the process protocol in a particularly simple and efficient manner, for example, to filter the processes stored in the process protocol, to compare them, or to reconstruct them. Moreover, the APE provides the possibility to define different queries flexibly, and to combine, thereby, the advantages of so-called process operators and common data base functions flexibly with each other.

The common data base functions (also referred to as data base operators) may comprise: aggregate functions (average, sum, etc.), frequently in combination with grouping; analytical functions (Median, Quantile, etc.); conversion functions (String according to date, etc.); cryptographic functions (calculate hash value, encode and decode, etc.); date functions (calculate time differences, etc.); logical functions; mathematical functions; string functions (left, substring, etc.); join operations (concatenation of several tables).

According to the invention, for the analysis of the processes, the process protocol is accessed directly. Due to the data structure of the process protocol according to the invention (cf. description for FIG. 2A) and the query language APE, a variety of ad hoc analyses of the processes are enabled in an efficient manner, even with a very large amount of data.

A process operator is an operator or a function, which is applied to processes reconstructed from the process protocol, and which provides, as a result, a process protocol, a table, a value, or a graph.

Examples for process operators are:
Matching (determining process instances, which correspond to a certain pattern);
Rework (for example, the determination of frequencies of certain activities and processes);
Loop indicator (for example, the determination of frequencies of loops in processes);
Determining process graphs from a number of process instances;
Subtracting process graphs (for example, the determination of a difference between two process graphs);
Determining throughput times (for example, the throughput times between two predetermined process steps in a number of process instances);
Extracting sub-processes; and/or
Splitting process graphs (for example, by means of predetermined criteria).
Grouping (for example, determination of a process graph after a combination of certain process steps).

At first, the query language APE (Advanced Process Algebra Execution) is to be defined formally:

The process operators supported by APE implements an extension to relational algebra. The basis of the relational algebra, which here is assumed to be known, is relation $R=\{(r_{1,1},r_{1,2},\ldots,r_{1,m}),\ldots,(r_{n,1},r_{n,2},\ldots,r_{n,m})\}(r_{1,1},\ldots,r_{1,m})\ldots(r_{n,1},r_{n,2},\ldots,r_{n,m})$ tupel $r_{1,1},\ldots,r_{n,m}$ attributes The relational algebra, as a minimal system, requires the following operations:
projection
selection
cross product
union
difference and renaming The relational algebra is the basis for relational database systems and corresponding query languages (such as SQL). As it is not possible to implement the process operators using a relational algebra, the relational algebra is extended for the APE according to the invention.

Thereby, the process protocol is described as follows:

Assuming that $$R=\{(r_{1,1},r_{1,2},\ldots),\ldots(r_{n,1},r_{n,2},\ldots)\}$$

is a relation.

Then, a process protocol may be defined as process relation $$\{E_1, E_2, \ldots, E_k\},$$

$$E_i \subset R$$

$$\forall i, j \mid i \neq j: E_i \cap E_j = \emptyset$$

$$\bigcup_i E_i = R$$

Moreover, for each step process protocol, there exists an order relation:

$$O_i=(E_i,Q_i)$$

with
$O_i$ . . . ordered set as well as
$Q_i$ . . . order relation for $E_i$.

Thereby, the process protocol is defined as $$E := \bigcup_i O_i$$

The sets Ei are also referred to as case or process instance.

The process instances themselves are relations and as such are compatible with all relational operators.

Now, as base operators the following three operators are defined:

1) Case Selection
predicate $\phi$: E→{0,1}
Case Selection: $CS_\phi$: E→E'

$$E' := \left\{ \bigcup_i O_i \,\middle|\, O_i \in E \land \phi(O_i) = 1 \right\}$$

Examples for case selection operators are, for example, the matching operator for filtering process instances corresponding to a certain process pattern.

2) Crop Selection
Starting predicate $\rho_s$: R→{0, 1}
end predicate $\rho_e$: R→{0,1}
Crop-Case $CC_{\rho_s,\rho_e}$: $O_i$→$O'_i$ $O'_i = (\{e | e \in E_i \land \exists e_s \in E_i : \rho_s(e_s)=1 \land \exists e_e \in E_i : \rho_e(e_e)=1 \land e_s \le e \le e_e\}, Q_i)$ Crop-Selection $CS_{\rho_s,\rho_e} : E \to E'$ $E' = \{CC_{\rho_s,\rho_e}(O_i) | O_i \in E\}$ An example for this is cutting out the portion of a process protocol between a defined starting and a defined end activity for obtaining a new sub-process protocol from this.

Hereby, extensions are respectively that the predicate is met for the first time and is met for the last time. Moreover, several sub-streams may be extracted by CROP, as well as that only the first and the last activities should be comprised in the result set.

The order relation is maintained with respect to this predicate. Thus a new process protocol is created by applying this operator.

3) Event Projection

Projection $\delta: R \to R \circ R$ $\delta(r) = r \circ r_n | r \in E_i \land r_n \in E_i \land r < r_n \land \nexists r_z : r < r_z < r_n$ onto order relation $Q_i$ $\gamma(O_i) = (\{\delta(e) | e \in E_i\}, \{(\delta(q_s, q_e) | (q_s, q_e) \in Q_i\})$ Event-Projection $\Omega: E \to E'$ $\Omega(E) = \{\gamma(O) | O \in E\}$ This projection creates a new process protocol from a process protocol by concatenating adjacent entries. An application example for this is the use for calculating throughput times.

According to the invention, on the basis of the extension to relational algebra with respect to process algebra, a plurality of process operators may be mapped in the APE by means of a combination of base process operators. Moreover, all operators being defined on the relational algebra, are still available. Process operators and common database operators, thereby, may be combined freely.

The APE engine is adapted to receive APE statements from a client, to process the received APE statements, and to make the results of the processing available. The results may be subject to a subsequent processing, if needed, prior to being returned to the client.

Alternatively or additionally, the results of the APE engine may be provided, in order to perform, for example, further analyses based on the results (e.g., to further delimit the results). Also in this case, the results may be subjected to a subsequent processing prior to being provided to the APE engine.

Exemplarily, we have a look at a process protocol from a purchasing process having the following structure:

| Order ID | Event | Timestamp | Vendor |
|---|---|---|---|
| 1 | Create Purchase Order | 06.01.2012 11:01 | ABC Machine Inc |
| 1 | Approve Purchase Order | 07.03.2012 14:07 | ABC Machine Inc |
| 1 | Enter Goods Receipt | 01.04.2012 16:05 | ABC Machine Inc |
| 1 | Enter Invoice Receipt | 01.04.2012 17:02 | ABC Machine Inc |
| 1 | Payment | 03.05.2012 11:17 | ABC Machine Inc |
| 2 | Create Purchase Order | 14.02.2012 04:48 | CDF Manufacturing |
| 2 | Rework Purchase Order | 20.03.2012 07:26 | CDF Manufacturing |
| 2 | Reject Purchase Order | 24.04.2012 01:26 | CDF Manufacturing |
| 3 | Create Purchase Order | 29.04.2012 15:21 | HIJ Insurance Corp |
| 3 | Approve Purchase Order | 30.04.2012 17:16 | HIJ Insurance Corp |
| 3 | Enter Invoice Receipt | 30.04.2012 23:31 | HIJ Insurance Corp |
| 3 | Payment | 01.05.2012 08:38 | HIJ Insurance Corp |
| 4 | Create Purchase Order | 06.02.2012 17:16 | ABC Machine Inc |
| 4 | Approve Purchase Order | 28.03.2012 07:12 | ABC Machine Inc |
| 4 | Enter Goods Receipt | 31.03.2012 08:52 | ABC Machine Inc |
| 4 | Enter Invoice Receipt | 05.04.2012 19:55 | ABC Machine Inc |
| 4 | Payment | 10.04.2012 14:52 | ABC Machine Inc |
| 4 | Enter Invoice Receipt | 20.04.2012 23:02 | ABC Machine Inc |
| 4 | Payment | 29.04.2012 21:07 | ABC Machine Inc |

The process steps or activities of the processes are stored in the process protocol, to which the APE engine has access. In the process protocol, also information on the respective vendor may be stored for each process step. However, it is advantageous, if the process protocol only comprises references to the vendor information, whereby the vendor information may be stored in an external data source (cf. FIG. 2A).

In the following, an example for an APE statement (statement in APE notation) is reproduced, by means of which an average throughput time of the processes between the activities "Create Purchase Order" and "Payment" can be calculated for all vendors, whereby between these two activities, an arbitrary number of other activities may be present. Because the activities may potentially occur several times in a process instance, we respectively regard the first occurrence of the activity "Create Purchase Order", and take all throughput times for an arbitrary occurrence of the activity "Payment" into consideration.

```
TABLE ("VENDOR",
    MEDIAN(
        CALC_THROUGHPUT(
            REMAP_TIMESTAMPS("TIMESTAMP", DAYS),
            FIRST_OCCURRENCE ['Create Purchase Order']
            TO ANY_OCCURRENCE ['Payment']
        )
    )
)
```

The process operator "throughput times" in the APE engine may be implemented by a combination of several process base operators:

(process operator) The process protocol is reduced by a CROP selection to the first activity "Create Purchase Order" as well as the last activity "Payment".

Hereby, as starting predicate
"Activity"='Create Purchase Order',
is used, and as end predicate, hereby,
"Activity"='Payment'
is used.

(DB operator) The attribute "TIMESTAMP" is converted to a daily time stamp.

(process operator) An event projection is carried out. Thereby, in the end, a new relation is formed, in which the previous and the subsequent event may be accessed respectively as tupel of the result relation.

(DB operator) The daily time stamp of the subsequent event is subtracted from the time stamp of the previous event.

(DB operator) A grouping of the calculated throughput times according to the attribute "VENDOR" is carried out by means of the aggregator "MEDIAN".

According to the invention, it is also possible to combine operators, which are applied to process protocols with operators, which are applied to common tables.

In this example, the result of the query mentioned above is returned in the form of a table, in order to display it, for example, as table at the client. The result may also be returned in another format according to the invention, e.g., as graph, as diagram, as process stream, etc.

In this case, the result would thus be:

| Vendor | Median |
|---|---|
| ABC Machine Inc | 83 |
| HIJ Insurance Corp | 2 |

We have a look at some further examples for APE queries.

Figure 5A:
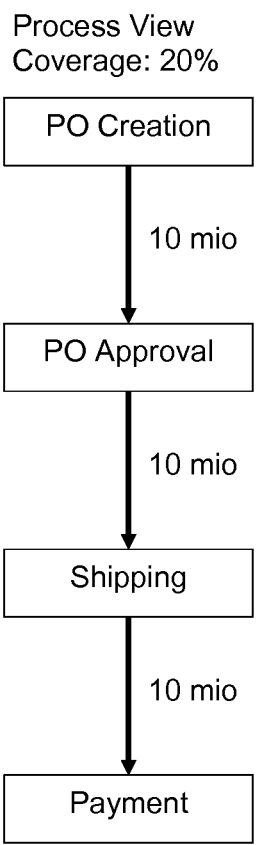
FIGS. 5A-B show an example of a visualized process.
Figure 5B:
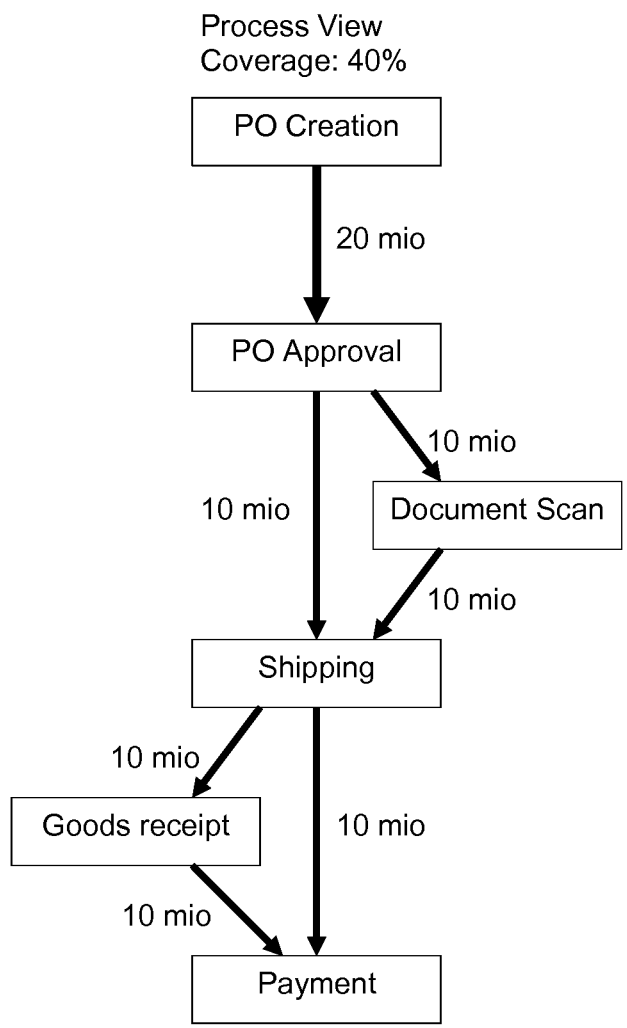

FIGS. 5A-B show an example of a visualized process. For example, 50 million activities are stored in the process protocol, which respectively are assigned to a process.

Now, the average throughput times of all processes are determined by means of a first APE query, which start with the activity "Create Purchase Order" and end with the activity "Payment", and which have a coverage of 20%. I.e., those process variants are queried in the process protocol, which altogether constitute 20% of all processes in the process protocol. The following APE query may be used in order to perform this calculation:

```
FILTER
    MATCH_PROCESS (
        STARTING["Create Purchase Order"] AS "Start",
        ENDING["Payment"] AS "End"
        CONNECTED BY EVENTUALLY ["Start", "End"]
    ) = 1;
VARIANT_TABLE =
    TABLE (
        VARIANT( ) AS V,
        CUME_DIST( ) AS R
    ) ;
FILTER
    VARIANT_TABLE.R
    < 0.2;
GRAPH( );
```

In this example, at first, the process protocol is restricted to those cases, which start with the activity "Create Purchase Order" and which end with the activity "Payment".

For this, the process operator "MATCH_PROCESS" is used.

In the second step, a temporary list of the process variants as well as the cumulated distribution for each process variant is determined. For this, the process operator VARIANT( ) as well as the DB operator CUME_DIST( ) are used.

According to the invention, it is possible to use results of the analysis for further filtering. For this, the APE engine comprises a reference between the source relations and the respective results. In the example, the link between the table VARIANT_TABLE aggregated on the variant level, as well as the original process protocol are created. Hereby, it is possible to restrict the process protocol in the next step to those cases, the variant of which belongs to the most frequent 20% (cumulated distribution <0.2).

In order to display the process graph, now, a graph is calculated by means of the process operator GRAPH( ) on the basis of the filtered process protocol, and is returned.

The process graph for the result of this first query is shown in FIG. 5A. Moreover, the frequency of the edge runs is calculated and displayed. This information cannot be derived from the possibilities known from prior art.

The user now changes the degree of coverage to 40%. By means of a second APE query, now, the frequency of the edge runs of all process instances is determined, which start with the activity "Create Purchase Order" and which end with the activity "Payment". Due to the data structure (process protocol, which is provided as process stream) according to the invention and the query language APE according to the invention, the result is visualized in real time at the display means of the user. The process graph for the result of this second query is shown in FIG. 5B. 40% of all processes in the process protocol correspond to this process variant. The most frequent process variant is indicated here by arrows highlighted in bold, wherein the thickness of the arrows corresponds to the number of the concrete processes.

In case the coverage is increased to 100%, then all different process variants of the processes stored in the process protocol are displayed.

According to the invention, the user has the possibility to apply, for example, certain filters to the visualized process variants. Thus, he can select, for example, an activity (e.g., "shipping"), and select all process variants from the process protocol, which run via the selected activity. The previous APE query, thereby, would have to be extended by the following filters:

FILTER MATCH_PROCESS (NODE ["Shipping"])=1

In the following, the architecture and the data structure according to the invention are described in further detail.

With reference to FIG. 1, the access of the clients to the server may be carried out, for example, via the Internet or an Intranet. A client may, for example, be a computer with an Internet client. Alternatively, as client, also an application program, for example, a table calculation may be provided, which has access to the server via an interface. A client may also be embodied as a mobile terminal.

The server may be a Web server (e.g., Apache HTTP server or Microsoft Internet Information Server), which is provided for handling the data transmission between an Internet client and the server.

Further, the server comprises the APE engine described above. The APE engine is adapted to receive APE queries and to convert or transform the latter into an executable form. The executable form of an APE query may be an executable program or a script. A cache memory may be assigned to the server or the APE engine in order to be able to store intermediate results or partial results during the execution of the executable program or the script efficiently.

The data required for the process protocol may be loaded within an ETL process from one or more source systems (CRM 1 to CRM n) and may be stored according to a data structure according to the invention as process protocol. The data structure is described in further detail below.

Preferably, the data or the process protocol are stored in the main memory (e.g., as In-Memory-data base). Thereby, the performance during the evaluation of the processes is substantially improved additionally. The source systems may comprise, for example, standardized ERP systems (e.g., SAP AG, Walldorf, Germany) or proprietary systems, which store the process instances of one or more business processes.

It is preferred, if the process protocol is divided into several approximately equal parts, wherein processes are always stored in one part completely. Thereby, a partitioning of the process protocol is achieved, wherein the partitions may be processed in parallel.

Figure 2A:
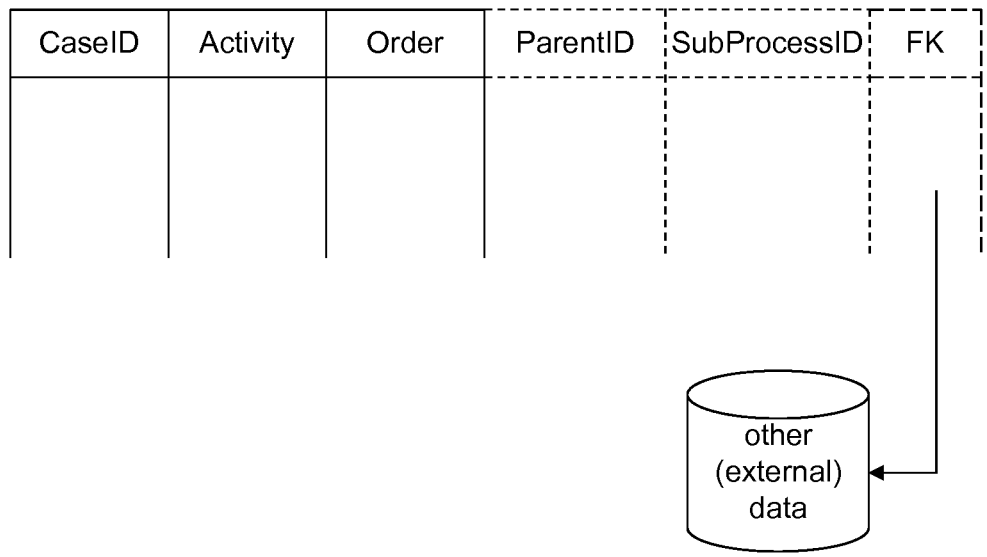
FIG. 2A shows a data structure of the process protocol according to the invention.
Figure 2B:
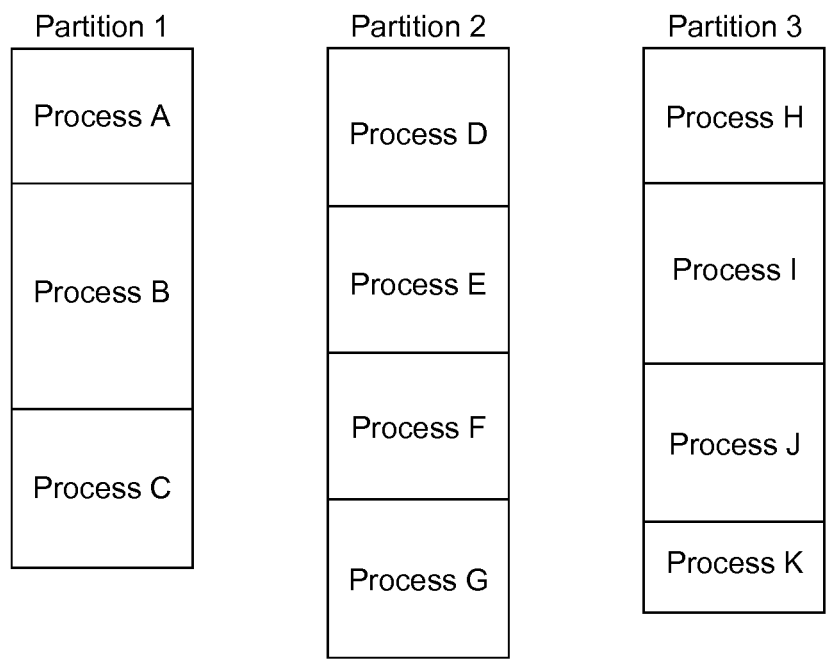
FIG. 2B shows an exemplarily partitioned process protocol.

An exemplary partitioning is shown in FIG. 2B. The process protocol, here, has been divided into three approximately equal partitions, which respectively are stored in the main memory.

During the loading from the source systems, all data required for the process protocol is loaded. Alternatively, the data may also be loaded incrementally. That means, only that data is loaded, which has been modified since the last loading or which has been newly added.

In case a direct access to one or more source systems is not possible, an interface IF for the access to the corresponding source systems may be provided.

FIG. 2A shows a data structure of a process protocol according to the invention.

In the simplest configuration, the data structure of the process protocol has three attributes (fields), namely, "CaseID", "Activity", and "Order".

The attribute "CaseID" is a unique identification of a process instance (e.g., a concrete business process). The attribute "Activity" describes a process step of a process instance. The attribute "Order" indicates the sequence of the process steps within a process instance.

By means of the attribute "CaseID", all process steps are assigned to a concrete process instance. According to an embodiment of the invention, the attribute "CaseID" may be a combined unique identifier (combined key).

The attribute "Activity" may store an identifier of the process step. The identifier may, for example, be a description of the process step.

The attribute values may be stored in a compressed manner, for example, by means of a Dictionary-Encoding method.

Generally, the attribute "Order" indicates the sequence of the process steps within a process instance. According to an embodiment of the invention, a point of time (date/time) may be stored in the attribute "Order", which indicates the point of time, at which the corresponding process steps have been carried out. The use of time points (e.g., time stamps) has the advantage that, thereby, throughput times of the processes can be calculated.

According to the invention, the process protocol or the data sets stored therein is adapted to, at first, sort according to the attribute "CaseID", and then according to the attribute "Order".

The source data (External Process Data), which also comprises process data and which may also be stored in a data base or otherwise in an external system (source systems), is loaded into the main memory, and then is sorted physically in the main memory, as explained above. That means, the process steps belonging to a process are stored in the main memory at adjacent addresses.

By "process protocol", in the following, it is always referred to the sorted process protocol stored in the main memory. This process protocol in the following is also referred to as a process stream.

The sorting of the process steps within a process instance has the advantage that the process instances are present in a grouped form. Hereby, the process steps within a stream can always be processed sequentially and in the correct order. Moreover, a predecessor/successor relation of the process steps within a process instance may be calculated advantageously.

In the following, an example of a process protocol is given.

| CaseID | Activity   | Order |
|--------|------------|-------|
| 1      | Create PO  | 08:00 |
| 1      | Shipping   | 10:00 |
| 1      | Payment    | 11:00 |
| 2      | Create PO  | 08:00 |
| 2      | Approve PO | 08:15 |
| 2      | Shipping   | 08:30 |
| 2      | Payment    | 09:00 |

According to the invention, the process protocol is stored in the main memory in a column orientated manner, i.e., the content of the process protocol is stored column-wise.

The data structure of the process protocol according to the invention and the sorting of the data sets according to the invention has the advantage that by means of the APE engine according to the invention described above as well as the query language APE described in the following with reference to FIG. 4, the reconstruction of processes and operations applied thereto can be carried out in linear time.

Additionally or alternatively, the data structure of the process protocol may comprise one or more references (foreign keys) to external data. These references may be stored in one or more attributes "FK". Thereby, it is possible to augment the result of a process analysis by additional data. Alternatively or additionally, processes may also be filtered by means of the external data.

External data is data, which is not stored in the process protocol. This data may be stored in the same system as the process protocol. According to an embodiment of the invention, the external data may also be stored in the main memory. An example for external data is master data of the clients involved in the processes.

Figure 4:
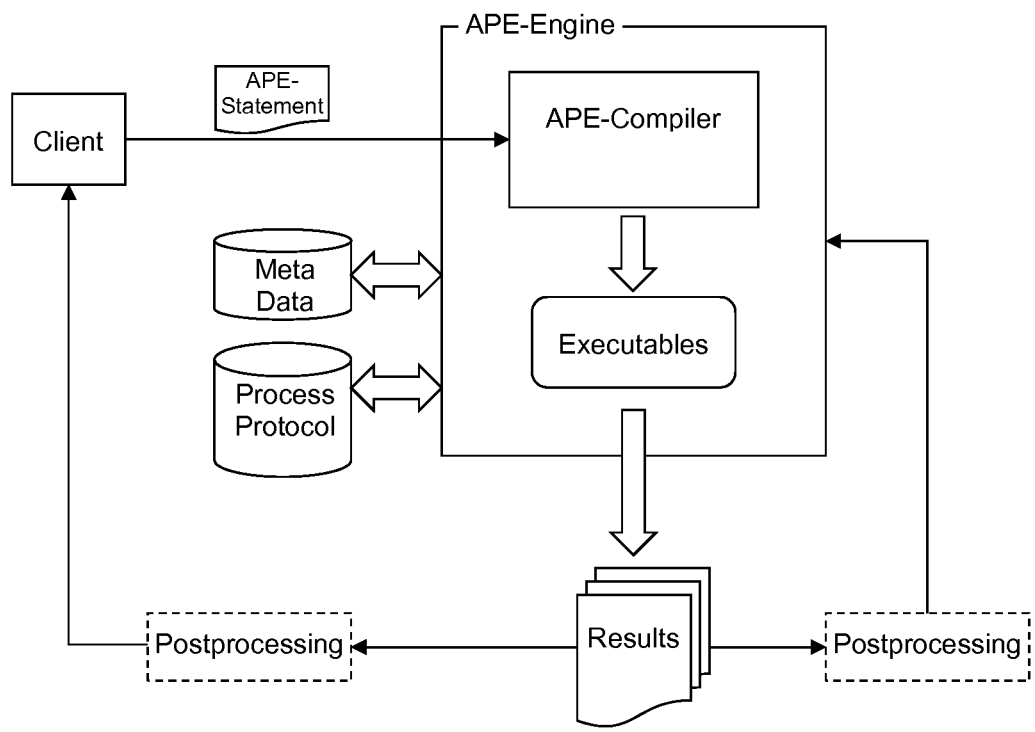
FIG. 4 shows a block diagram with and an APE engine according to the invention.

FIG. 4 shows a block diagram with an APE engine according to the invention. By means of this block diagram, a possible embodiment of the query language APE according to the invention is described in further detail.

In a first step, the received APE statement is handed over to a parser of the APE compiler. The parser parses the APE statement and generates from the latter, an abstract syntax tree (AST), which in the following is reproduced for the APE statement in a simplified form.

```
TABLE <CalculationType>
    VENDOR <Column>
    MEDIAN <Aggregate>
        CALC_THROUGHPUT (ANY ...) <ThroughputCalculation>
```

The abstract syntax tree represents a logical sequence of the single operations or operators of the APE statement.

The abstract syntax tree subsequently is executed or processed in an In-Memory execution environment. It may be advantageous, if the abstract syntax tree, prior to the execution, is converted into a format suitable for the In-Memory environment. Further, it may be advantageous to optimize the abstract syntax tree prior to the execution, in order to, for example, reduce the runtime.

During the execution of the abstract syntax tree in the In-Memory environment, at first, an execution plan is generated by means of the abstract syntax tree, which subsequently is executed.

In the following, the generation of the execution plan is described by way of example.

The execution plan indicates the steps and the sequence, in which the operations or operators of the APE engine are executed.

During generation of the execution plan, at first, all operators are extracted from the syntax tree, and are provided as references in the execution plan.

The execution plan for the syntax tree mentioned above comprises the following elements:
1. Operators
    OP 1:
        Operator Type: COLUMN
        Operator Ref. ID: 1
        Column Name: VENDOR OP 2:
   Operator Type: Throughput Calculation
   Operator Ref. ID: 2
   Start: ANY . . .
   End: ANY . . .
   Time Units: Days
2. Aggregates (execution plan)
   GROUPERS: OP_REF 1
   AGGREGATORS:
      Aggregation Function: MEDIAN
      Aggregation Function Operator: OP_REF 2

"Operator Ref. ID", hereby, is a unique identifier of the respective operator, by means of which the operator can be referenced in the execution plan (by means of "OP_REF").

In the example mentioned above, the operator "OP 1" indicates in the execution plan that the results are to be grouped (GROUPERS: OP_REF 1) according to vendors (Column Name: VENDOR). The operator "OP 2" in the execution plan indicates that a throughput time (Throughput Calculation) is to be calculated between two process steps (Start/End).

Hereby, it is important that the operator "OP 2" is regarded to as a normal column of a table, although it is calculated by using the process stream.

The execution of the execution plan is described by means of the following example: During executing the execution plan, at first, all operators are executed (in the example mentioned above, the operators "OP 1" and "OP 2").

For the operator "OP 1", simply a reference to the column "VENDOR" is returned. In the column "VENDOR", information on the respective vendors is stored.

For the operator "OP 2", which here is referred to as "Throughput Operator", a program code (Executable) is generated and executed. Alternatively, a program code which already is existing may be executed. With respect to the present example, the program code is adapted to calculate, for the processes stored in the process protocol, the throughput times between the activities "Create Purchase Order" and "Payment".

After both operators "OP 1" and "OP 2" have been executed, two references to columns are available, namely, a reference to the column "VENDOR" and a reference to the calculated throughput times.

Subsequently, filters may be applied to the columns in an optional step, in order to, for example, take only those data sets in further calculations steps into consideration, which match a certain filter criterion.

After the operators have been executed, in a next step, the two references to the generated columns are handed over to a so-called aggregation automate. The aggregation automate is adapted to group the calculated throughput times according to vendors, and, for each vendor, to determine an average throughput time.

After also this last step has been carried out by the APE engine, the result of the APE statement or the APE query is returned to the client.

Alternatively or additionally, the result of the APE engine may be provided as input for further APE queries. Thereby, nested queries can be executed. Hereby, it is preferable, if the result of the APE engine is provided as process stream.

Above, an example of an APE query has been described, according to which the throughput time has been used as operator. According to the invention, also other access operators may be used, which may also be combined, if needed. Examples for such process operators are given with reference to FIG. 1.

As can be seen from the example of an APE query mentioned above, in an APE query, process operators can be combined with operators, which are applied to common tables, and/or with common DB operators (e.g., aggregations, joins, etc.).

The client receives the result of the APE query, and can visualize it at a display means. In case the result is returned, for example, as graph, the latter may also be displayed as process graph.

The calculation of throughput times may be carried out according to the invention on the basis of one or more calendars, as explained in further detail below.

The calculation of throughput times, in particular, of net throughput times, is of great importance for an exploratory analysis of process protocol. In prior art, throughput times are always calculated as gross throughput times, having the disadvantage that the calculated throughput time does not correspond to the throughput time relevant for the business (for example, service hours, delivery times on weekdays, etc.).

In the following, an exemplary method for ad hoc calculation of arbitrary net throughput times is specified:

For the calculation of throughput times on the basis of one or more calendars, according to the invention it is possible to disregard, for example, holidays, weekends, or certain daytimes.

For the determination of net throughput times between process steps, according to the invention, the method described below is provided.

For the calculation of net throughput times, the method according to the invention basically comprises two steps, wherein in the first step, the time specifications stored for the process steps in the process protocol are transformed (normalized) relative to a base, and wherein in the second step, a difference between the transformed time specifications assigned to the process steps is determined. As to the time specifications, these may be time stamps.

In order to transform or to normalize the time stamps, at first, all, preferably all distinct timestamps, are sorted in ascending order in the process protocol. This vector (in the following also referred to as time stamped vector) of the time stamps sorted in ascending order forms the starting base for the determination of an offset for each (distinct) time stamp in the process protocol.

Each time stamp may consist of a date (e.g., 31.05.2014) and time information (e.g., 13:37:00) with a given precision (for example, in seconds).

The time stamps, now, are transformed or normalized such that the difference between respectively two subsequently transformed time stamps is the net difference of their time difference in the target unit (for example, days, hours, . . . ).

For the transformation of the time stamps, the following may be specified:

For each day (date), there exists a definition, whether it should be taken in consideration and which not. This definition, for example, may be achieved, for example, by indication of weekdays (e.g., Monday), or by an explicit indication of date values by means of a calendar (e.g., 24.05.2016). Such a definition may also be provided for weeks, months, calendar quarters, etc.

For each day, there exists a definition, which hours of the day are to be considered and which not. This may be achieved, for example, by indication of the hours of a weekday (e.g., Monday: 08:00 to 17:00), or by the explicit indication of the hours with respect to a certain date by means of a calendar (e.g., 24.05.2016: 08:00 to 17:00). Such a definition may also be provided for weeks, months, calendar quarters, etc. For example, which days of a week are to be taken into consideration may also be defined on a weekly basis, or on a monthly basis, which days are taken into consideration.

The maximum net duration of a day is the sum of the active day intervals of this day.

Also, several calendars may be provided, which may be taken into consideration simultaneously. For example, it may be indicated by means of a first calendar, which weeks of the year are to be taken into consideration, while it may be indicated by means of a second calendar, which days of this year are not to be taken into consideration. Thus, exceptions may be defined, for example, on a daily basis for the weeks indicated in the first calendar.

For a simpler processing, for each time stamp, the date may be used as consecutive number (for example, as Julian date), and the time specification as a time indication of sufficient precision (for example, milliseconds since 00:00 o'clock).

In case, the difference is calculated in days, then, the time component of the time stamp may be ignored, and the calculation may be carried out only on the basis of the date component.

Duration of the time specification is required in a certain unit (e.g., hours, minutes, or seconds). The next duration corresponds, for example, the net hours (or net minutes, or net seconds) of the time stamps since 00:00 o'clock.

In this respect, here is an example: Assuming that for a certain day, a time interval from 08:00 to 17:00 o'clock to be taken into consideration is set, then, the net duration on a minute by minute basis starting at 03:00 o'clock as well as the net duration starting at 07:00 o'clock respectively is 0 minutes. The net duration starting at 09:00 o'clock is 60 minutes. The net duration starting at 17:00 o'clock is 540 minutes. The net duration starting at 23:00 o'clock is 540 minutes and, thereby, corresponds to the maximum net duration of that day, because the interval 17:00 to 23:00 o'clock is not taken into consideration.

The total daily net time is the net time of the entire day.

The transformation of the time stamp now is carried out according to the following method:

In a first step, an initialization is performed, comprising
The result vector is initialized as zero vector having the same dimension as the time stamp vector;
The current daily offset is initialized with the daily offset of the first time stamp;
the current time offset is initialized with the next duration of the first time stamp;
the current offset value is initialized with 0; and
the current offset value is assigned to the result vector.

In a second step, the following method is carried out for all time stamps in the time stamp vector:
as long as the daily offset of the next time stamp is greater than the current daily offset:
increase the offset value by the next duration of the current day (if the day is not taken into consideration, then this is 0) minus the current time offset;
increase the current daily offset by 1; and
set the current daily offset to 0;
in case the daily offset of the next time step is equal to the current daily offset:
increase the current offset value by the difference between current time offset and the net duration of the next time stamp;
assign the current offset value to the result vector at the position of the next time stamp; and
start with the next time stamp.

As a result, by means of the time stamps being thus transformed, net times between two arbitrary time stamps from the set of all time stamps can be calculated.

According to a preferred embodiment of the invention, the time specifications of the process steps of the process protocol are stored in a Dictionary Encoding. The method for determination of the net duration may be carried out directly on the Dictionary Encoded time specifications, and thereby, on compressed data.

According to a further preferred embodiment of the invention, the values are sorted in ascending order in the dictionary. Thereby, the previous sorting for determination of the net duration can be omitted.

In the simplest case, the throughput time, i.e., the net throughput time of a complete process instance between the first process step and the last process step of the process instance can be calculated. However, it is also possible to calculate the net throughput time of a sub-process of the process instance, i.e., the net throughput time between process steps of the process instance being different from the first process step or being different from the last process step.

The selection of the process steps, between which the net throughput time is to be calculated, may be performed by the user at a user interface.

Alternatively or additionally, the selection of the process steps, between which the net throughput time is to be calculated, may also result based on rules. Examples for this are:
First occurrence of a certain process step within a process instance;
Last occurrence of a certain process step within a process instance;
Arbitrary occurrence of a certain process step within a process instance;
First occurrence of an arbitrary process step within a process instance;
Last occurrence of an arbitrary process step within a process instance;
Process step with a predetermined identification.

This list of examples for a rule-based selection of process steps is not final. Also, other rules for the selection of process steps may be provided.

For several process instances, such net throughput times may be calculated. In particular, for all process instances comprised in the process protocol, such net throughput times can be calculated. From the calculated net throughput times, for example, an average net throughput time for several or all process instances of a process protocol can then be calculated. In a further example, also those process instances may be selected from the process protocol, the net throughput time of which matches a predetermined criterion (e.g., the net throughput time which is below 5 days).

In the following, it is explained, how parallel sub-processes of process instances can be recognized.

A process may consist of several sub-processes, wherein the sub-processes may have been executed in parallel. Sub-processes, in turn, may also consist of sub-processes, which may also have been executed in parallel. The recognition of parallel running sub-processes merely by means of the attribute "Order" is not possible in most cases. The recognition of parallel running sub-processes, however, is necessary for the correct determination of process hierarchies by means of process operators, the latter not being guaranteed by methods known from prior art.

For this, according to the invention, an extended form of the data structure of the process protocol is provided, which is also shown in FIG. 2A. This extended form of the data structure only comprises two additional attributes, namely, "ParentID" and "SubProcessID".

The attribute "SubProcessID", hereby, stores a unique identification for a sub-process of a process or for a sub-process of a sub-process. The attribute "ParentID" indicates to which parent process a sub-process belongs. By means of these two attributes, according to the invention, a hierarchy of processes is described, wherein sub-processes within the hierarchy may have been executed in parallel. This parallelism is recognized in any case, and independently of the hierarchy depth.

According to the invention, moreover, it is possible to determine the values of the attributes "ParentID" and "SubProcessID" on the basis of other features comprised in the data. The information comprised in the attributes may also be stored in another form or in another structure.

According to the invention, by means of the extended form of the data structure, it becomes possible to calculate a separation of a process into parallel sub-processes and an aggregation of parallel sub-processes in linear time. Thereby, also parallel running sub-processes can be analyzed efficiently and, in particular, correctly. Experiments have shown that thereby, all points within a process, at which the process separates into parallel sub-processes, or at which parallel sub-processes are merged can be calculated for process protocols with several millions of data sets within a fraction of a second. In the following, the calculation of the hierarchy of processes or the determination of parallel running processes is described in further detail with reference to FIGS. 3A-C.

As far as the hierarchy depth amounts to 1 at a maximum (i.e., if a process has sub-processes, but these sub-processes, in turn, have no sub-processes), the attribute "ParentID" may be omitted.

FIGS. 3A-C show an example of a process protocol (FIG. 3A), a status hierarchy (FIG. 3B) determined therefrom, and a corresponding graph (FIG. 3C).

The determination of parallel sub-processes and the determination of the process hierarchy based on the process protocol are described in further detail by means of FIGS. 3A-C. FIG. 3A is a process protocol, in which six activities (process steps) A to F are stored for the process with the CaseID=1. This process comprises two sub-processes, which have been executed in parallel. The two sub-processes comprise no further sub-processes such that the attribute "ParentID" is not required necessarily. The activities belonging to the respective sub-processes are identified by the values of the attribute "SubProcID".

In a first step, a status hierarchy is determined from the process protocol. The determined status hierarchy is shown in FIG. 3B. The configuration of the status hierarchy advantageously is carried out in the main memory, wherein the process protocol is processed sequentially in an iteration step. The status hierarchy, thus, may be determined according to the invention with a time complexity of $O(n)$.

By means of FIG. 3B, it is explained, how the status hierarchy is generated.

In a first step (Step 1), the first data set (Order=1) of the process protocol is processed. This first data set corresponds to the first step of the process. The value of the attribute "SubProcID" assigns this first data set to a sub-process. In the present case, the sub-process is the main process itself. The parent process, therefore, is not set.

In the first step (Step 1), the sub-process "Main" is added to the status hierarchy. Further, a pointer to the first data set is assigned to the sub-process "Main", which at the same time is the main process. That means, in the status hierarchy, the data set "1" is assigned to the sub-process "Main".

In a second step (Step 2), two values are assigned to the sub-process "Main" in the status hierarchy. Because the second added value (2) differs from the first added value (1) in the second step, additionally, an edge "1→2" is added to the status hierarchy. The edges "1→2" added in this step and in the following step, indicate a predecessor/successor, namely, "y" is successor to "x".

In a third step (Step 3), the third data set (Order=3) of the process protocol is processed. This third data set corresponds to the third step of the process. In contrast to the two first data sets, this third data set is assigned to the sub-process "SP1". The attribute "ParentID" of the third data set indicates that it is assigned to the parental sub-process "Main" (=main process), i.e., the third data set belongs to the process "SP1", which is a sub-process of the process "Main".

In the third step (Step 3), the sub-process "SP1" is added to the status hierarchy. Further, the data set "3" is assigned to the sub-process "SP1" in the status hierarchy. The data set "2" which has been assigned to the sub-process "Main" in the second step (Step 2) has not changed and, thereby, remains assigned to the sub-process "Main".

Because the value "SP1" of the attribute "SubProcID" is different from the value "Main" of the attribute "ParentID", and because no value has been assigned in a second step (Step 2) to the sub-process "SP1", with respect to the third data set, the first process step of the sub-process "SP1" is concerned. The predecessor of the third process step accordingly is that process step of the parent process, which recently has been added to the status hierarchy. In the present example, this is the second process step, which has been added in the second step (Step 2). In the third step, therefore, additionally an edge "2→3" is added to the status hierarchy.

In a fourth step (Step 4), the fourth data set (Order=4) of the process protocol is processed. This fourth data set corresponds to the fourth step of the process. In contrast to the third data set, this fourth data set is assigned to the sub-process "SP2", which is assigned to the parental sub-process "Main" (=main process), i.e., the fourth data set belongs to the process "SP2", which is a sub-process of the process "Main".

Because the sub-process "SP1" as well as the sub-process "SP2" are assigned to the same process "Main", with respect to the two sub-processes "SP1" and "SP2", processes are concerned, which have been executed in parallel.

In the fourth step, the sub-process "SP2" is added to the status hierarchy. Further, the data set "4" is assigned to the sub-process "SP2" in the status hierarchy. The data set "2" added to the sub-process "Main" in the third step (Step 3) does not change and, thereby, remains assigned to the sub-process "Main". The data set "3" assigned to the sub-process "SP1" in the third step (Step 3) in not changed either, and thereby remains assigned to the sub-process "SP1".

Because the value "SP2" of the attribute "SubProcID" is different from the value "Main" of the attribute "ParentID", and because no value has been assigned to the sub-process "SP2" in the third step (Step 3), with respect to the fourth data set, the first process step of the sub-process "SP2" is concerned. The predecessor of the fourth process step, therefore, is that process step of the parental process, which has been added to the status hierarchy recently. In the present example, this is the second process step, which has been added in the second step (Step 2). In the third step, therefore, additionally an edge "2→4" is added to the status hierarchy.

In the fifth step (Step 5), the fifth data set (Order=5) of the process protocol is processed. This fifth data set is assigned to the sub-process "SP1", which is assigned to the parental sub-process "Main" (=main process), i.e., the fifth data set belongs to the process "SP1", which is a sub-process of the process "Main". The data set "2" assigned to the sub-process "Main" in the fourth step (Step 4) does not change and therefore, remains assigned to the sub-process "Main". The data set "4" assigned to the sub-process "SP2" in the fourth step (Step 3) is not changed either, and therefore remains assigned to the sub-process "SP2".

Because the sub-process "SP1" already has been added to the status hierarchy (in the third step (Step 3)), with respect to the fifth data set, a process step of the sub-process "SP1" is concerned, which is not the first process step of the sub-process "SP1".

The predecessor of the fifth process step accordingly is that process step of the sub-process "SP1", which has been added to the status hierarchy recently. In the present example, this is the third process step, which has been added in the third step (Step 3). In the fifth step, therefore, an edge "3→5" is added to the status hierarchy.

In a sixth step (Step 6), the sixth data set (Order=6) of the process protocol is processed. This sixth data set is assigned to the sub-process "Main", which at the same time is the main process (ParentID=Main).

The data set "6" is assigned to the sub-process "Main". Now, it can be derived from the status hierarchy that the current data set (=6) of the sub-process "Main" is different from the value (=2), which has been assigned to the sub-process "Main" in the fifth step. Moreover, it is known that the sub-process "Main" comprises several sub-processes (in the present example SP1 and SP2). The sixth process step, therefore, is a process step, according to which the sub-processes (=sub-processes SP1 and SP2) are merged. The sixth process step, therefore, constitutes a so-called "join point". Therefore, in the status hierarchy, the current value (=6) of the sub-process "Main" is assigned respectively to the sub-processes.

Accordingly, the sixth process step has two predecessors, namely, the respectively recently added process steps of the sub-processes "SP1" and "SP2". Therefore, in the sixth step, additional edges "5→6" and "4→6" are added to the status hierarchy.

Optionally, a further edge "2→6" from the previous status of the sub-process "Main" may be inserted.

From the status hierarchy thus generated or from the edges of the status hierarchy, now, a process hierarchy can be derived, which may comprise sub-processes executed in parallel, and which, for example, may be displayed as a tree structure or as graph.

FIG. 3C shows a graph generated from the status hierarchy according to FIG. 3B. Here, the parallel running sub-processes "SP1" and "SP2" can be seen as parts of the main process "Main". The edge "2→6", here, is illustrated as dashed arrow.

This procedure has the advantage that the hierarchy of a process, which comprises process paths which are executed in parallel, can be determined with a time complexity of $O(n)$, and, in fact, independently of the depth of the hierarchy within the process.

Because also parallel paths within a process can be determined correctly, a process analysis of processes with parallel process paths always yields a correct result. Thus, for example, an average throughput time may be determined for processes, which start with the process step "A", and according to which the process steps "C" and "D" are executed in parallel. With respect to the methods known from prior art, in this case it cannot be guaranteed that process steps actually being carried out in parallel, in fact, are also recognized as such. Thus, for example, it may happen that during the determining of an average throughput time for processes, which start with the process step "A" and according to which the process steps "C" and "D" are carried out in parallel that not all processes being executed are taken into consideration, although they actually would match to the filter criterion. This necessarily leads to a wrong average throughput time.

The substantial advantage of the invention is that a process analysis is carried out directly on the process protocol, and, in fact, independently of the fact, whether the data stored in the process protocol describe "simple" processes or "complex" processes, which may comprise nested sub-processes or sub-processes being executed in parallel.

The invention can be implemented in digital electronic circuitry, or in computer hardware, firmware, software, or in combinations of them. The invention can be implemented as a computer program product, that is, a computer program tangibly embodied in an information carrier, for example, in a machine-readable storage device or in a propagated signal, for execution by, or to control the operation of, data processing apparatus, for example, a programmable processor, a computer, portable computer, smartphone, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry. The data can be stored in a database management system, e.g. a relational database management system, object oriented database management system, or hierarchical database management system.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. The components of the system can be interconnected by any form or medium of digital data communication, for example, a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. Accordingly, other embodiments are within the scope of the following claims.

What is claimed is:

1. A computer-implemented method for storing process data in a computer system for efficient analysis of process data, wherein the process data is generated by executing real processes, and is stored as a component of source data in at least one source system, wherein the computer system comprises a processor and a storage means coupled to the processor operatively, wherein the process data comprise a number of process instances, wherein each process instance comprises a number of process steps, wherein the method comprises:
    allocating, by the processor, a storage area for the process data in the storage means;
    loading, by the processor, the source data comprising the process data, from the at least one source system, and storing the process steps of the source data according to a predetermined data structure in the allocated storage area of the storage means, wherein the loading of source data and the storing of process steps in the allocated storage area of the storage means comprises a step, in which the process steps of the source data are transformed into the predetermined data structure, wherein the predetermined data structure comprises at least:
        a first attribute, in which a unique identification of the process instance of the respective process step is stored;
        a second attribute, in which an identification of the respective process step is stored; and
        a third attribute, in which the sequence of the process steps within a process instance is stored;
    sorting, by the processor, the process steps in the allocated storage area, wherein the process steps, at first, are sorted according to the first attribute, and subsequently, according to the third attribute physically, wherein subsequent process steps of a process instance are stored in directly adjacent storage sections of the allocated storage area.

2. The method of claim 1, wherein the identification of the process step is a description of the process step.

3. The method of claim 1, wherein the process steps are stored in the storage means column-wise.

4. The method of claim 1, wherein at least one of the attributes is stored in the storage means in compressed form.

5. The method of claim 4, wherein a Dictionary Encoding method is used for compressing.

6. The method of claim 1, wherein a process instance comprises a number of sub-processes, which themselves in turn comprise a number of sub-processes, wherein a predetermined data structure further comprises a hierarchy identification, in which the hierarchy of the process steps is stored.

7. The method of claim 6, wherein the hierarchy identification comprises
    a fourth attribute, in which an identification of a parental process of the respective process step of the sub-process is stored; and
    a fifth attribute, in which a unique identification of the sub-process of the respective process step is stored.

8. The method of claim 7, wherein the predetermined data structure further comprises at least a sixth attribute, in which a reference to external data is stored, wherein a process instance and/or a process step is linked to external data by means of the reference.

9. The method of claim 8, wherein the reference is stored as a pointer to the storage address of an external data set.

10. The method of claim 8, wherein the external data comprise data sets, which are stored in a first table.

11. The method of claim 10, wherein the table is stored in every storage means, in which the process data is stored.

12. The method of claim 10, wherein the external data comprise data sets, which are stored in at least one second table, wherein the first table comprises attributes, in which references to the data sets of the at least one second table are stored.

13. The method of claim 1, wherein the process steps in the allocated storage area are stored distributed over several partitions, wherein the process steps belonging to a process instance are stored in the same partition.

14. The method of claim 13, wherein the several partitions are selected in the allocated storage area such that at least two of the several partitions may be accessed.

15. The method of claim 1, wherein the storage means is a main memory of the computer system.

16. A computer program product, comprising a computer readable storage device, on which computer readable instructions are stored, which, if executed in a processor of the computer, instruct the processor of the computer to execute a method for storing process data for efficient analysis of process data according to claim 1, wherein the processor is coupled to the storage means operatively, wherein the process data comprise a number of process instances, and wherein each process instance comprises a number of process steps.

17. A computer-based system, comprising:
    a processor;
    a storage means being operatively coupled to the processor; and
    a computer readable storage medium being operatively coupled to the processor, wherein instructions are stored on the computer readable storage means, which, if executed by the processor of the system, instruct the processor of the system to execute a method for storing process data for efficient analysis of process data according to claim 1.

\* \* \* \* \*